(12) United States Patent
Kitayama

(10) Patent No.: US 7,689,983 B2
(45) Date of Patent: Mar. 30, 2010

(54) INFORMATION PROCESSING METHOD AND APPARATUS AND RECORDING MEDIUM

(75) Inventor: Takuro Kitayama, Tokyo (JP)

(73) Assignee: Sony Corporation, Tokyo (JP)

( * ) Notice: Subject to any disclaimer, the term of this patent is extended or adjusted under 35 U.S.C. 154(b) by 821 days.

(21) Appl. No.: 09/859,277

(22) Filed: May 17, 2001

(65) Prior Publication Data

US 2001/0044935 A1 Nov. 22, 2001

(30) Foreign Application Priority Data

May 19, 2000 (JP) .......................... P2000-147986

(51) Int. Cl.
*G06F 9/44* (2006.01)
*G06F 12/00* (2006.01)
(52) U.S. Cl. ...................... 717/170; 717/122; 717/169; 707/203
(58) Field of Classification Search ................. 717/107, 717/122, 162, 168–178; 719/331, 332
See application file for complete search history.

(56) References Cited

U.S. PATENT DOCUMENTS

| | | | | |
|---|---|---|---|---|
| 5,579,509 | A * | 11/1996 | Furtney et al. | 703/27 |
| 5,634,114 | A | 5/1997 | Shipley | |
| 5,915,112 | A | 6/1999 | Boutcher | |
| 6,513,153 | B1 * | 1/2003 | Lee | 717/100 |
| 6,519,767 | B1 * | 2/2003 | Carter et al. | 717/140 |
| 6,560,592 | B1 * | 5/2003 | Reid et al. | 707/2 |
| 6,658,659 | B2 * | 12/2003 | Hiller et al. | 717/170 |
| 6,826,750 | B1 * | 11/2004 | Curtis et al. | 717/170 |
| 6,868,425 | B1 * | 3/2005 | Bergstraesser et al. | 707/103 R |

(Continued)

FOREIGN PATENT DOCUMENTS

EP 0 498 130 8/1992

(Continued)

OTHER PUBLICATIONS

"Compatibility, standards, and software production", Succi et al., Dec. 1998, pp. 140-146. Online retrieved at <http://delivery.acm.org/10.1145/340000/338185/p140-succi.pdf>.*

(Continued)

*Primary Examiner*—Tuan Q Dam
*Assistant Examiner*—Thuy Dao
(74) *Attorney, Agent, or Firm*—Frommer Lawrence & Haug LLP; William S. Frommer; Thomas F. Presson

(57) ABSTRACT

A processing program, apparatus and method wherein each component has version information showing the version of the component and a version compatible information table showing with which one of the past self versions the component has a compatibility. Information showing with which version there is the compatibility or information with which version range there is the compatibility is shown in the version compatible information table. When the reference destination component is referred to from the reference source component, the presence or absence of the compatibility between the version designated by the reference source component and the version of the reference destination component is checked by using the version compatible information table. If a plurality of compatible components exist, the component of the latest version is selected as a reference destination component.

6 Claims, 7 Drawing Sheets

VERSION COMPATIBLE INFORMATION TABLE 5

| START VERSION | END VERSION | FLAG |
|---|---|---|
| 4.0 | · | EQUAL |
| 10.0 | · | NEWER/EQ |
| · | 2.0 | OLDER |
| 6.0 | 8.0 | BETWEEN |
| : | : | : |

U.S. PATENT DOCUMENTS

2002/0143801 A1 10/2002 Okamoto et al.
2004/0031030 A1* 2/2004 Kidder et al. ............... 717/172

FOREIGN PATENT DOCUMENTS

| JP | 411143694 A | * | 5/1999 |
| JP | 11282687 A | * | 10/1999 |
| JP | 2000 112763 | | 4/2000 |

OTHER PUBLICATIONS

"What is Java binary compatibility?", Drossopoulou et al., Oct. 1998, pp. 341-361. Online retrieved at <http://delivery.acm.org/10.1145/290000/286974/p341-drossopoulou.pdf>.*

"Version models for software configuration management", Conradi et al., Jun. 1998, pp. 232-282. Online retrieved at <http://delivery.acm.org/10.1145/290000/280280/p232-conradi.pdf>.*

* cited by examiner

VERSION COMPATIBLE INFORMATION TABLE 5

| START VERSION | END VERSION | FLAG |
|---|---|---|
| 4.0 | · | EQUAL |
| 10.0 | · | NEWER/EQ |
| · | 2.0 | OLDER |
| 6.0 | 8.0 | BETWEEN |
| : | : | : |

INFORMATION PROCESSING METHOD AND APPARATUS AND RECORDING MEDIUM

BACKGROUND OF THE INVENTION

1. Field of the Invention

The invention relates to information processing method and apparatus for managing versions of a plurality of components which are mutually linked and used and to a recording medium for such an apparatus.

2. Description of the Related Arts

In many cases, software which is used in an information apparatus such as computer apparatus, portable information apparatus, or set top box for receiving digital broadcast is constructed by combining a plurality of software which are referred to as components and used as parts. The component is loaded and read into a memory as necessary, for example, when the software is activated, so that it is loaded into the software and used.

The component is often updated by an addition, change, or the like of a function, so that its version is updated. For example, in case of updating the version of a certain component in the foregoing portable information apparatus, by installing the version updated component by a predetermined method, the original component is replaced with the version updated component. Therefore, the software into which the original component ought to be loaded assembles the version updated component after that in place of loading the original component.

It is presumed that the component of a new version has a backward compatibility (lower-to-upper compatibility) to a component of an old version. The backward compatibility of the component can be held if a version is updated such that the external specifications of the original component are not changed such as a mere addition of the function.

However, if a version is updated such that the external specifications of the original component are changed, for example, like a change in interface specifications, a change in operation accompanied with a change in external specifications, or a change in argument, return value, or the like, the backward compatibility of the component cannot be always held. Hitherto, in such a case, there is a problem that such a version update often becomes a cause of an erroneous operation of a system due to a difference between the versions.

To avoid such a trouble, hitherto, when a component is loaded, the version of the component used at the time of development is certainly used. Such a method, however, has a problem such that there is a possibility that a plurality of components of different compatible versions are simultaneously loaded upon execution of software and a use amount of a memory increases.

OBJECTS AND SUMMARY OF THE INVENTION

It is, therefore, an object of the invention to provide information processing method and apparatus which can avoid a trouble of a system which is caused due to a difference between versions of components which are loaded and to a recording medium for such an apparatus.

Another object of the invention is to provide information processing method and apparatus which can prevent a situation such that a number of components of different compatible versions are simultaneously loaded into a system and to a recording medium for such an apparatus.

According to the first aspect of the invention, to solve the above problem, there is provided an information processing method comprising: constructing a program using a plurality of components, wherein each component of the plurality of components includes version information indicating a current version of each component and a version compatible information table indicating compatibility of the current version of each component with previous versions of each component; and determining, when another component sends a request to load each component, compatibility between the current version indicated by the version information and a version requested by another component by using the version compatible information table included in each component.

According to the second aspect of the invention, there is provided an information processing apparatus comprising: means for constructing a program using a plurality of components, wherein each component of the plurality of components includes version information indicating a current version of each component and a version compatible information table indicating a compatibility of the current version of each component with previous versions of each component; and means for determining, when another component sends a request to load each component, compatibility between the current version indicated by the version information and a version requested by another component by using the version compatible information table included in each component.

According to the third aspect of the invention, there is provided a computer program, stored in a tangible recording medium, for assembling a program, the program comprising executable instruction that cause a computer to: construct a program using a plurality of components, wherein each component of said plurality of components includes version information indicating a current version of said each component and version compatible information table indicating compatibility of the current version of said each component with previous versions of said each component; and determine, when another component sends a request to load said each component, compatibility between the current version indicated by said version information and a version requested by said another component by using said version compatible information table included in said each component.

As mentioned above, according to the inventions disclosed in the first and second aspects, when the component is used, the presence or absence of the compatibility between the version of the component and the version which has been presumed in the component when the component is used is discriminated by using the version compatibility information which the component has and shows the compatibility with the self past version, so that the trouble due to the difference between the versions of the components can be avoided.

According to the recording medium of the invention disclosed in the third aspect, since one or a plurality of components each having the version information showing the self version and the version compatible information showing the compatibility with the self past version have been recorded, by checking the version compatible information when the component read out from the recording medium is used, the trouble due to the difference between the versions of the components can be avoided.

The above and other objects and features of the present invention will become apparent from the following detailed description and the appended claims with reference to the accompanying drawings.

DETAILED DESCRIPTION OF THE PREFERRED EMBODIMENT

Figure 1:
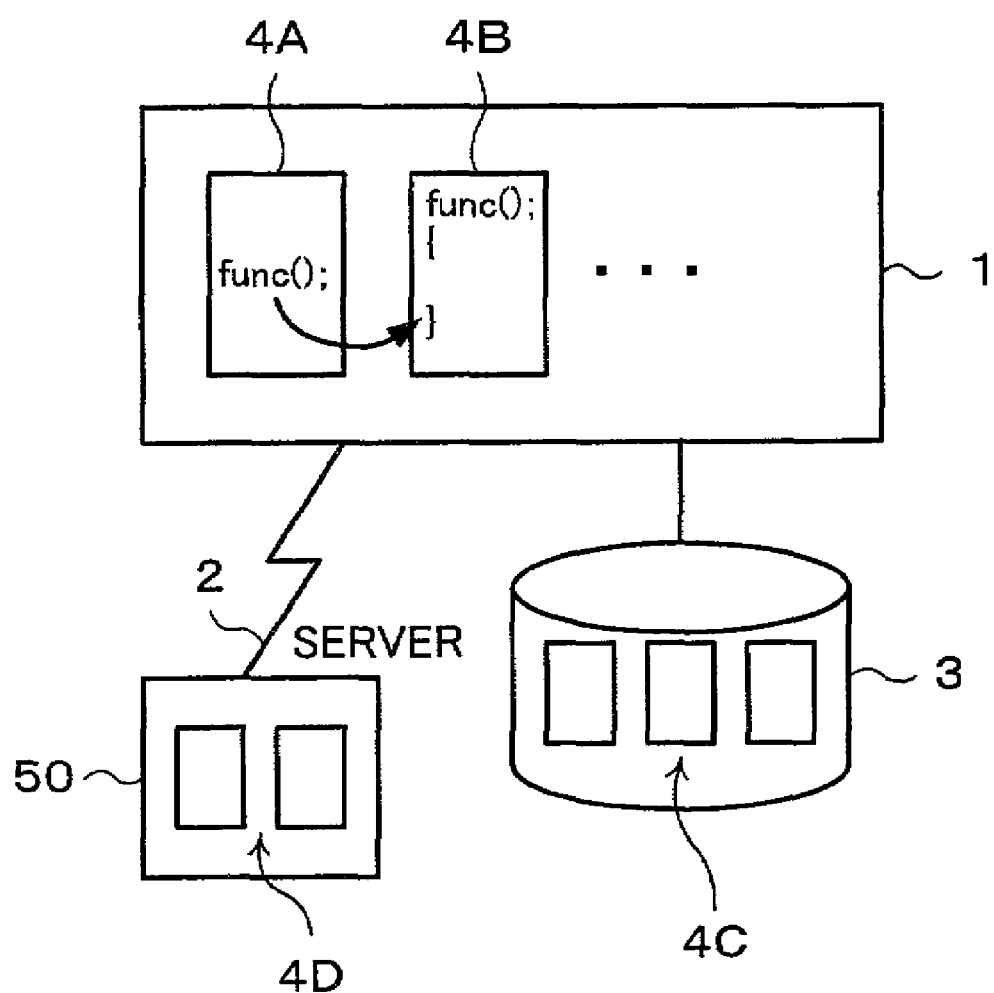
FIG. 1 is a schematic diagram showing a concept of a system which can be applied to an embodiment of the invention.

An embodiment of the invention will now be described hereinbelow with reference to the drawings. FIG. 1 shows a concept of a system which can be applied to the embodiment of the invention. In a target system 1 constructed on an information apparatus such as portable information apparatus or computer apparatus, to realize the operation of predetermined software, a plurality of components 4 having a relation such that functions or the like are mutually called are loaded.

The component indicates a program which can be used as a part of another program. The component has, for example, a plurality of functions and is used by a method whereby the function is called or a variable is referred to or the like from another component or program. For simplicity of explanation, it is now assumed hereinbelow that the function or variable defined in a component 4B is referred to on the basis of a description of a component 4A. In the example of FIG. 1, a function( ) which the component 4B has is called by a description "func( )" in the component 4A. At this time, the component 4A needs a component having a compatibility with the component 4B used at the time of development of the component 4A.

The component 4-4c which is not loaded in the target system 1 can be loaded, for example, from a secondary storing apparatus 3 connected to the target system 1. As a secondary storing apparatus 3, a hard disk apparatus, a CD-ROM (Compact Disc-Read Only Memory), or another memory medium can be applied. The invention is not limited to them, but a semiconductor memory device such as a flash memory or the like can be applied as a secondary storing apparatus 3. Further, a floppy disk, an MO (Magneto Optical Disk), or the like can be applied as a secondary storing apparatus 3. The component 4B which is designated by the component 4A is read out from the secondary storing apparatus 3 by the target system 1. The read-out component 4B is developed into a memory and loaded into the target system 1.

The invention is not limited to the above method but the component 4 can be also downloaded from a server system 50 through a network 2 connected to the target system 1 and loaded into the target system 1.

Figure 2:
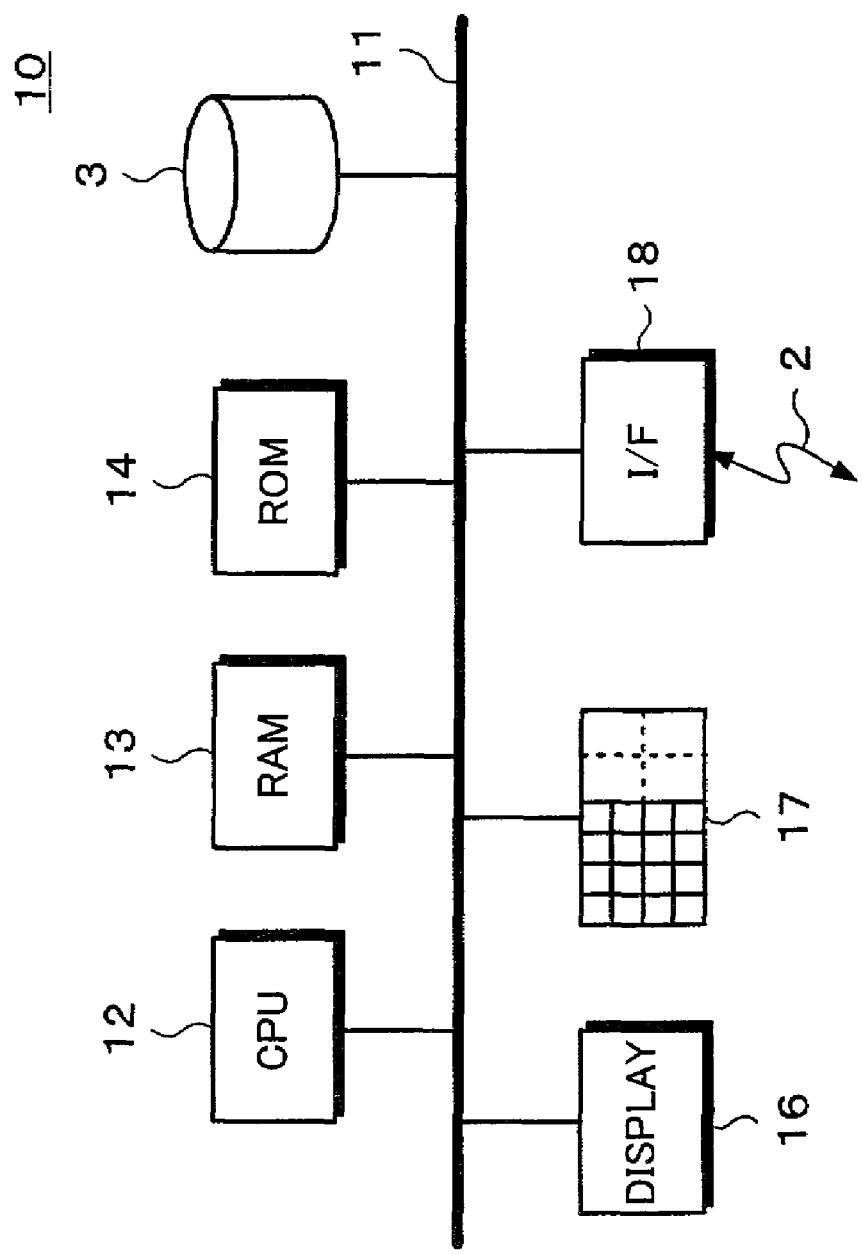
FIG. 2 is a block diagram showing a construction of an example of an information apparatus in which a target system is constructed.

FIG. 2 shows a construction of an example of an information apparatus on which the target system 1 is constructed. Explanation will now be made on the assumption that the target system 1 is constructed on a portable information apparatus 10. The invention is not limited to the above construction but the target system 1 can be also constructed on another information apparatus such as personal computer, set top box, cellular phone apparatus, home-use gaming apparatus, or the like. A CPU (Central Processing Unit) 12, an RAM (Random Access Memory) 13, an ROM (Read Only Memory) 14, and the above secondary storing apparatus 3 are connected to a bus 11. The RAM 13 is a work memory of the CPU 12. Other programs such as OS (Operating System) as basic software for making the portable information apparatus 10 operative, component loader for loading a component, and program which is necessary upon activation has previously been stored in the ROM 14.

As a secondary storing apparatus 3, for example, a flash memory as a non-volatile and rewritable memory can be used. In this case, the secondary storing apparatus 3 can be constructed as a detachable apparatus. The invention is not limited to such a type, a hard disk apparatus can be used as a secondary storing apparatus 3. A recording medium such as MO, floppy disk, or the like can be also used as a secondary storing apparatus 3 by using a predetermined driving apparatus.

A display unit 16, an input unit 17, and a communication interface 18 are further connected to the bus 11. The display unit 16 is constructed by, for example, an LCD (Liquid Crystal Display). A display control command is issued from the CPU 12 and a predetermined display is performed onto the display unit 16 on the basis of the display control command. The input unit 17 is provided, for example, on the display unit 16 and constructed by a touch panel through which display contents of the display unit 16 can be transmitted. The communication I/F 18 is connected to the network 2 based on a radio or wire communication and controls a communication between the portable information apparatus 10 and the outside.

When the portable information apparatus 10 is activated, the program such as an OS or the like stored in the ROM 14 is activated by the CPU 12 and the target system 1 is constructed. For example, a predetermined program is activated on the target system 1 in response to an instruction issued from the input unit 17, and a necessary component is read out from the secondary storing apparatus 3 and stored into the RAM 13 and loaded in accordance with the description in the program.

The component stored in the secondary storing apparatus 3 can be properly updated. For example, if the secondary storing apparatus 3 is the flash memory, the updating of the component is performed by removing the flash memory from the portable information apparatus 10 and rewriting the contents in the memory. If the secondary storing apparatus 3 is the hard disk apparatus, for example, such an updating is performed by supplying the component from the outside through the communication I/F 18. If the predetermined driving apparatus is provided, the component to be updated can be also supplied from a detachable memory medium such as MO, floppy disk, or CD-ROM.

There are the following two methods of updating the component. The first method is a method of updating such that a function is merely added to the external specifications of the original component, for example, a method of updating by an addition of a new function to the component or a change of an internal process which does not appear in the external specifications. According to such an updating, the backward compatibility of the component after the updating to the original component is held. The second method is a method of updating by the change of the external specifications of the original component, for example, a method of updating by a change of the interface such as a change in argument or return value, or the like. According to such an updating, there is a possibility that the backward compatibility of the component after the updating to the original component is not held. When the component is used, it is necessary to use a component having a compatibility with a component that is presumed.

Version information is added to the component and the resultant component is stored into, for example, the foregoing secondary storing apparatus 3. The version information is updated each time the updating of the component as mentioned above is executed. If the components have been stored in the foregoing secondary storing apparatus 3 or an external storing apparatus, it is necessary that a plurality of components having the same component name but different versions can be handled as different file names. At this time, a mapping of the component names, version information, and file names can be realized by, for example, the following methods.

The first method is a method of forming a file name by combining the component name and the version information. For example, assuming that the component name is "COMP" and the version is "1.00", the file name is set to "COMP1_00" or the like.

The second method is a method of setting the file name to a directory name and setting the version information to a file name. In the above example, the file name is set to "COMP/1_00". "/" is a delimiter indicative of a layer of the directory.

The third method is a method of using a multiplexed file system. The component name is used as a file name and a plurality of files are managed by the same file name. Although they are seen as one file from the user, a plurality of files are managed on the management. Upon reading from the file and writing into the file, the version information is designated in accordance with the file name and the file is opened and, thereafter, the actual reading or writing operation is executed.

Figures 3, 4:
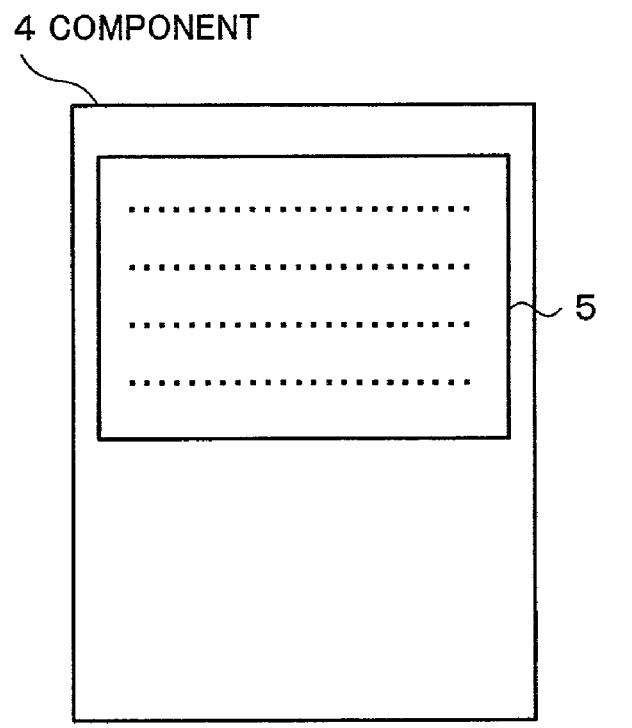
FIG. 3 is a schematic diagram showing a basic structure of a component according to the invention.
FIG. 4 is a schematic diagram showing a structure of an example of a component compatible information table.

In the above example, the component name is set to "COMP" and the component of the version "1.00" and the component name "COMP" is accessed by, for example, the following command train.

fd =open("COMP", "1.00", flags);

read(fd, buffer, size);

FIG. 3 shows a basic structure of the component 4 according to the invention. As mentioned above, according to the invention, the component 4 has a version compatible information table 5 for showing the version having the compatibility among the old versions of the component. Information which is described in the version compatible information table 5 is designated by the user when the component is formed.

FIG. 4 shows a structure of an example of the version compatible information table 5. Three fields of a start version, an end version, and a flag are provided for each entry (row) in the version compatible information table 5. The version having the compatibility of the components of the same name as that of the component having the version compatible information table 5 is expressed by each entry. That is, the component of the version which satisfies one of the entries in the version compatible information table 5 means that it has the compatibility with the relevant component.

In the version compatible information table 5, the meanings of the start version and end version are different depending on values shown by flags. In this example, five kinds of values of the flags such as "EQUAL", "NEWER/EQ", "OLDER", "BETWEEN", and "ALL" are specified. In FIG. 4, the value "ALL" is omitted. The meanings of the start version and end version in each value of the flag are as follows.

(1) When the value of the flag is "ALL", this means that there is the compatibility between the present version and all of the versions older than the present version irrespective of the start version and end version.

(2) When the value of the flag is "EQUAL", this means that there is the compatibility only in the version which coincides with the version designated as a start version. When the value of the flag is "EQUAL", there is no need to designate the end version.

(3) When the value of the flag is "NEWER/EQ", this means that there is the compatibility with the version which coincides with the version designated as a start version or the versions newer than the version designated as a start version. Also in this case, there is no need to designate the end version.

(4) When the value of the flag is "OLDER", this means that there is the compatibility with the versions older than the version designated as an end version. There is no compatibility with the version shown in the end version. When the value of the flag is "OLDER", there is no need to designate the start version.

(5) When the value of the flag is "BETWEEN", this means that there is the compatibility with the versions which coincide with the version designated as a start version or newer than the version designated as a start version and older than the version designated as an end version. There is no compatibility with the version designated as an end version.

Not only one version having the compatibility with the version of the relevant component is designated by the version compatibility information table 5 but also the versions having the compatibility can be designated by a range from a certain version to a certain version.

For example, in case of the component having a version compatible list shown in FIG. 4, there is the compatibility with the version which satisfies one of the above conditions. However, it is assumed that the larger the numeral of the version is, the newer the version is.

(1) Version 4.0

(2) Version 10.0 or version newer than it (3) Versions older than version 2.0

(4) Version 6.0 or version which is newer than it and older than version 8.0

Figure 5:
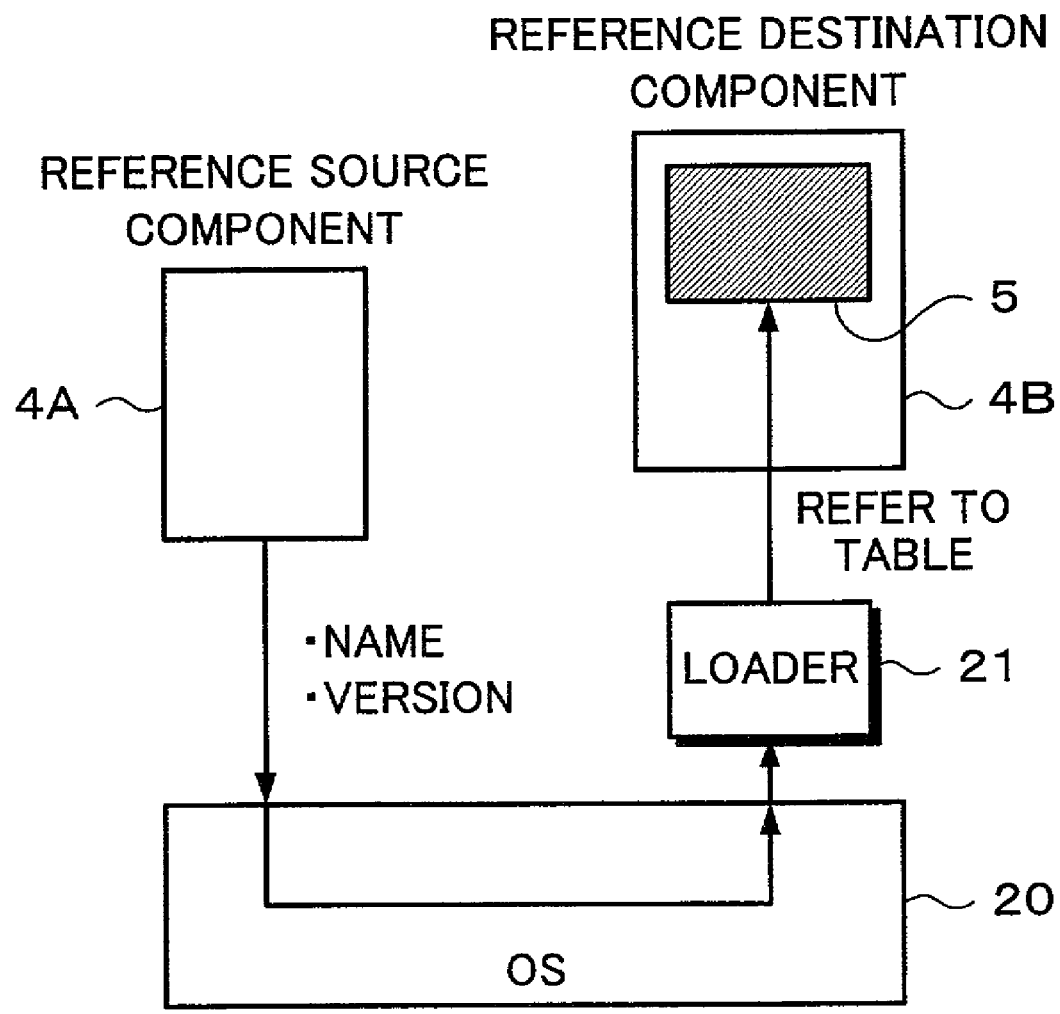
FIG. 5 is a block diagram schematically showing a loading mechanism of components in the target system.

A method of loading the component by using the version compatible information table as mentioned above will now be described. The loading of the component is performed by a program called a component loader (hereinafter, abbreviated as a loader). FIG. 5 schematically shows a loading mechanism of the component in the target system 1. It is assumed that a predetermined program is previously activated in the target system 1 and the component 4A has been read out and stored into the RAM 13. On the basis of the description of the component 4A, the other component 4B is called and assembled into the component 4A.

Explanation will now be made by presuming a case where in the component 4A serving as a reference source, the function defined in the other component 4B (reference destination component 4B) is called or the variable is referred to. This case actually corresponds to a process which is executed on the basis of a control of an OS 20 in accordance with the description for instructing the call of the function or reference to the variable in the component 4A.

In the case where the component 4A refers to the component 4B, the component 4A issues a request to the OS 20 to load the reference destination component 4B. At this time, the component name and version of the component which is loaded are designated by the component 4A. The version which is designated is a version of the component 4B used at the time when the reference source component 4A is developed.

When the component 4A is requested to load the component 4B, the OS 20 transfers the loading request of the component 4B to a loader 21. The component name and version of the component which is loaded are included in the loading request. In response to the loading request from the OS 20, on the basis of the designated component name and version, the loader 21 discriminates whether the component having the compatibility with the requested component 4B exists in the components loaded in the target system 1 at present or not.

Figure 6:
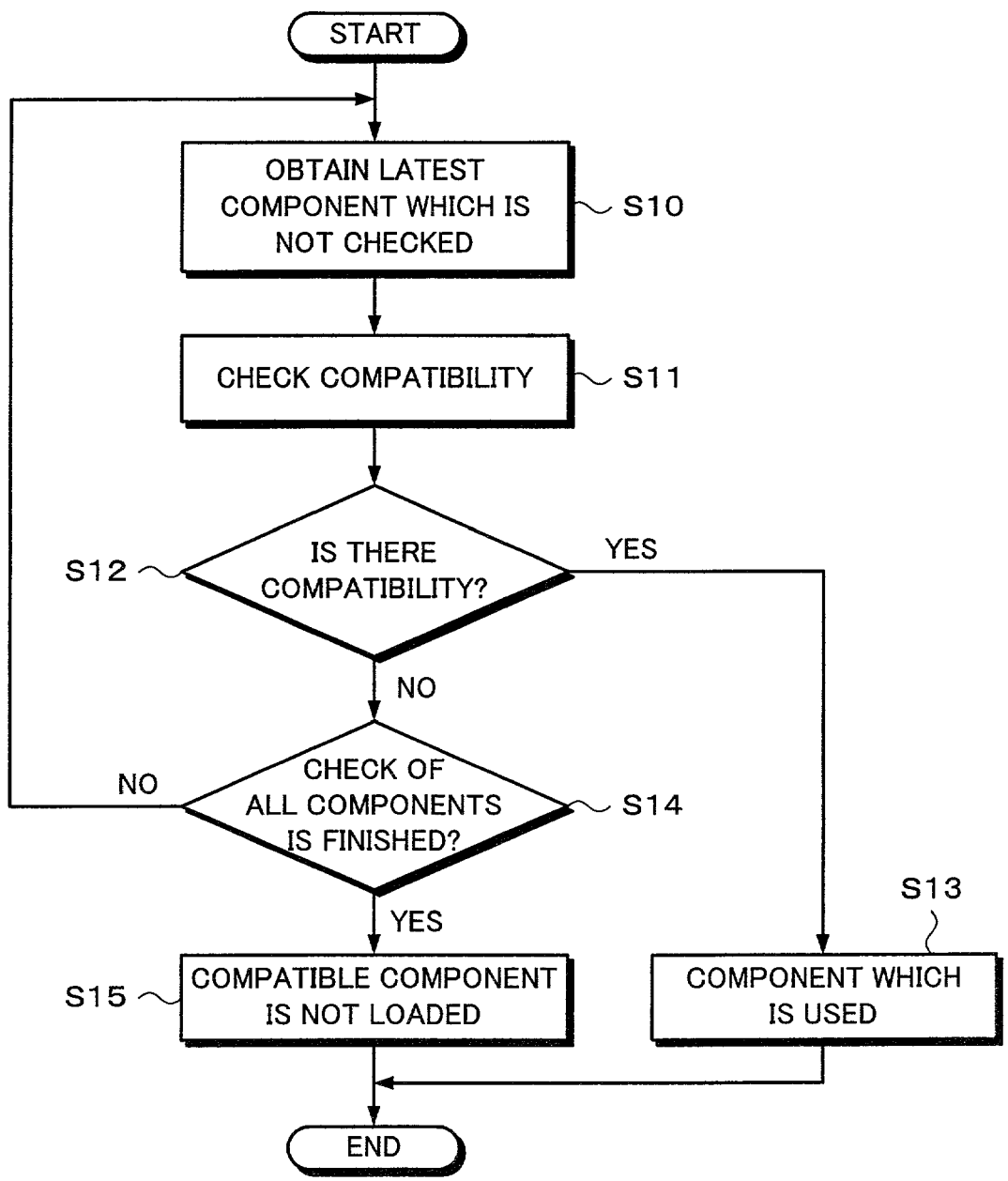
FIG. 6 is a flowchart showing an example of processes for discriminating whether a component having a compatible version exists among components loaded in the system or not.

FIG. 6 is a flowchart of an example of a process for discriminating whether the component having the compatibility with the requested component 4B exists in the components loaded in the system 1 at present or not. The process by the flowchart of FIG. 6 is executed by the loader 21. In first step S10, the component of the latest version among the components which have been loaded in the system 1 and have the same name as that of the component 4B whose loading has been requested is obtained.

In step S11, the compatibility of the component obtained by the loader 21 in step S10 to the version requested to the reference source component 4A is checked. If it is determined that there is the compatibility (step S12), the processing routine advances to step S13 and it is determined that the component obtained in step S10 is the necessary component 4B. The series of processes is finished.

a method of checking the compatibility in step S11 will be described in detail hereinlater.

If it is determined in step S12 that there is no compatibility, the processing routine advances to step S14. Whether all of the components loaded in the system 1 have been checked or not is discriminated. If there is the component which is not checked yet, the processing routine is returned to step S10. The compatibility of the component of the latest version among the components which are not checked yet is checked.

If it is decided in step S14 that the check of the compatibility with respect to all of the components loaded in the system 1 has been finished, the processing routine advances to next step S15. It is determined that the component of the version having the compatibility with the component of the version requested to the reference source component 4A is not loaded in the system 1. The series of processes is finished.

As a result of such a process, if it is determined that the component of the version having the compatibility with the component 4B of the version requested to the reference source component 4A has been loaded in the system 1 by the process in step S13, the component (reference source component 4A) which requested the loading of the component 4B is notified of a fact that the requested component 4B has been found on the system 1. Thus, the component having the compatibility with the reference destination component 4B can be used in the reference source component 4A as a calling source.

As shown in step S15 mentioned above, as a result of the retrieval of the component, if it is determined that the component of the version having the compatibility with the requested component is not loaded in the system 1, it is necessary to newly load the relevant component into the system 1.

For example, if the components have been stored in the secondary storing apparatus 3, the component can be loaded from the secondary storing apparatus 3. For example, as shown in the example of FIG. 1, the necessary component is retrieved from a number of components 4C stored in the secondary storing apparatus 3 and loaded. First, whether the requested component has been stored in the secondary storing apparatus 3 or not is discriminated. If the component has been stored in the secondary storing apparatus 3, in order to distinguish the components of the same component name and different versions, a mapping regarding the components stored in the secondary storing apparatus 3 is performed on the basis of the component names and versions.

At the time of retrieval of the component in the secondary storing apparatus 3, it is sufficient that the name and version of the component to be retrieved and the contents in the version compatible information table are known. Therefore, there is no need to load all of the components stored in the secondary storing apparatus 3 into the RAM 13 for the purpose of retrieval. As already described, the component name and version can be known on the basis of the file name or the like.

First, the components of the same name as that of the requested component are retrieved. The retrieved components are sequentially retrieved from the new version. If the version of the retrieved component is the same as or newer than the requested version, the version compatible information table 5 in the component file is read out and stored into the RAM 13. On the basis of the version compatible information table 5 stored in the RAM 13, the check of the compatibility is performed by the following method.

As a result of the compatibility check, if it is decided that the component of the retrieved version has the compatibility with the component of the requested version, the component of the retrieved version is read out from the secondary storing apparatus 3 and stored into the RAM 13 and loaded into the system 1. At this time, there is no need to read the whole component but, for example, only the portion to be referred to can be read out from the reference source component. When the component is read out and stored into the RAM 13 and loaded into the system 1, the reference source component 4A is notified of such a fact. Thus, the reference destination component 4B can be used by the reference source component 4A.

Figure 7:
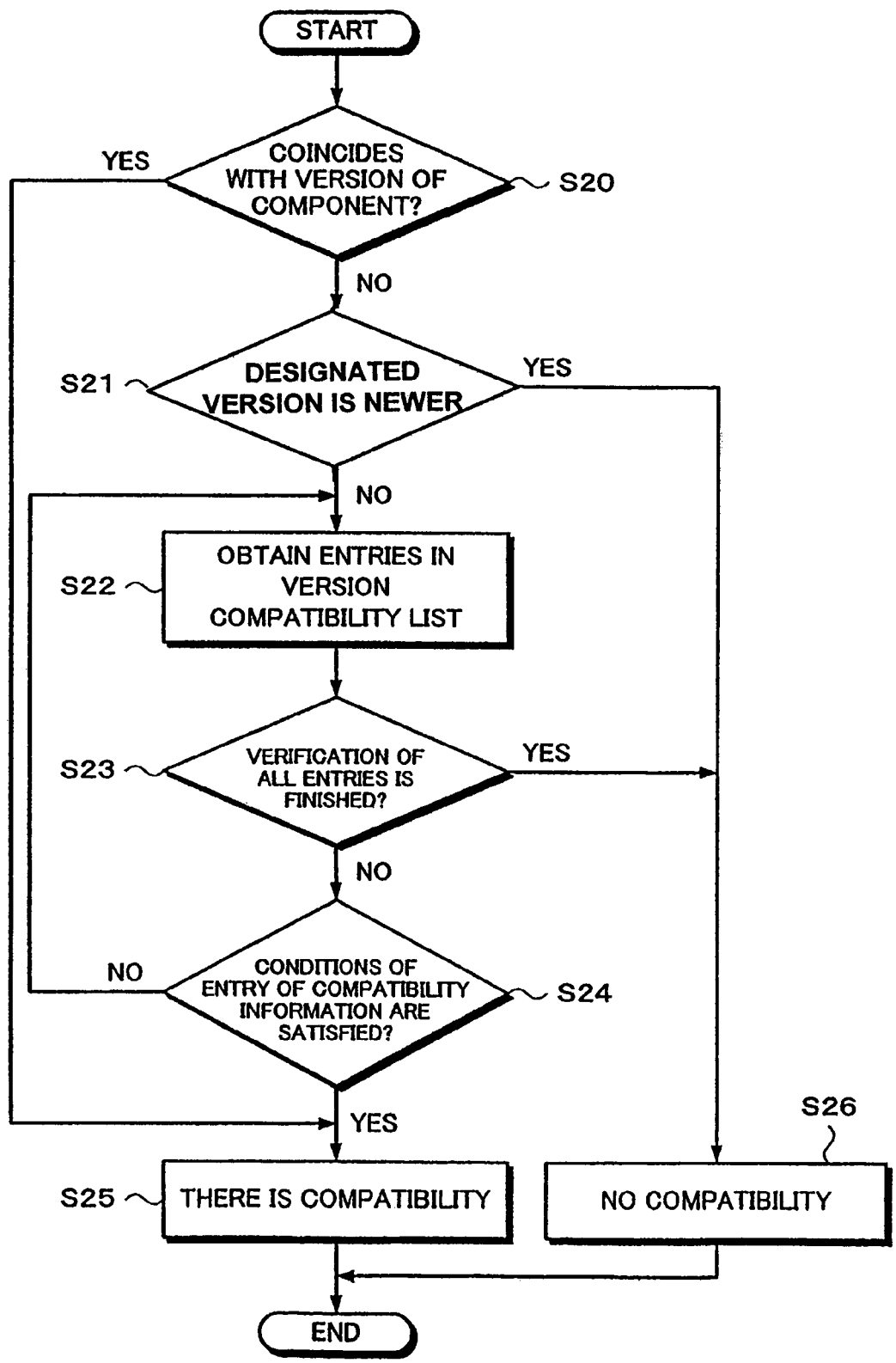
FIG. 7 is a flowchart showing a checking method of an example of a version compatibility of the component.

A checking method of an example of the version compatibility of the component mentioned above will now be described with reference to a flowchart of FIG. 7. The process by the flowchart of FIG. 7 is executed by the loader 21. In first step S20, the version designated by the reference source component is compared with the version of the reference destination component and whether they coincide or not is discriminated. If they coincide, it is decided that the reference destination component has the compatibility with the designated version (step S25).

If it is determined that the versions do not coincide in step S20, the processing routine advances to step S21. The designated version is compared with the version of the reference destination component and which one is new or old is discriminated. If the designated version is newer, the version of the reference destination component does not have the compatibility with the designated version (step S26).

If it is decided in step S21 that the designated version is old, the processing routine advances to step S22. In step S22, one of the entries in the version compatible information table 5 which the reference destination component has is extracted by the loader 21. In step S23, whether the verification of the condition has been finished with respect to all of the entries in the version compatible information table 5 or not is discriminated. If NO, the processing routine advances to step S24.

In step S24, whether the version designated by the reference source component satisfies the conditions written in the entries in the version compatible information table 5 or not is discriminated. If YES, it is determined that the version of the reference destination component has the compatibility with the designated version (step S25).

If it is decided in step S24 that there is no compatibility, the processing routine is returned to step S22. A similar process is executed with respect to the next entry in the version compatible information table 5.

As mentioned above, by checking the compatibility with the version designated by the reference source component with reference to the version compatible information table which the reference destination component has, whether the reference destination component has the version with the backward compatibility with designated version or not can be discriminated. Thus, an erroneous operation of the system due to the difference between the versions can be prevented.

Figure 8:
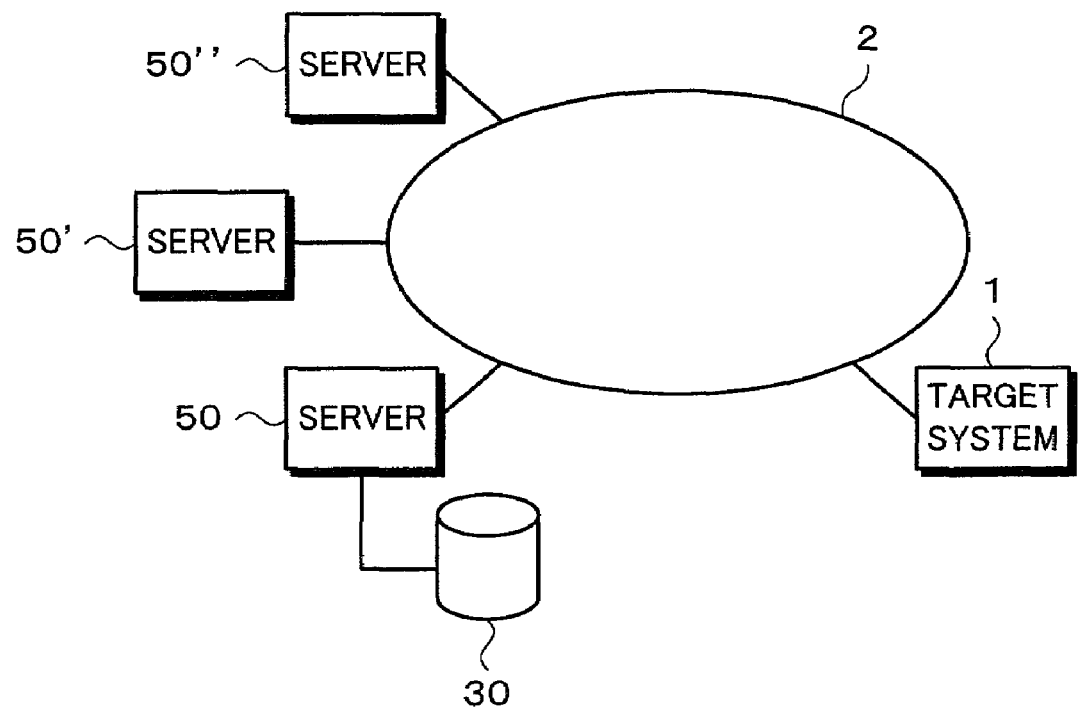
FIG. 8 is a schematic diagram showing a state where the target system and servers are connected through a network.

Although the case where the reference destination component has been stored in the secondary storing apparatus 3 has been described above, the invention is not limited to such an example. That is, as shown in FIG. 1, the reference destination component can be also stored in the server 50 through the network 2. FIG. 8 shows a state where the target system 1 is connected to servers 50, 50', 50", . . . through the network 2. The server 50 has an accumulating medium 30 comprising, for example, a hard disk apparatus. A number of components 4D have been stored in the accumulating medium 30. The component is stored into the accumulating medium 30 in a manner similar to the method of storing the component into the secondary storing apparatus 3 mentioned above.

Each of the other servers 50', 50", . . . connected to the network 2 also has a construction similar to that of the server 50 and a number of components are stored into an accumulating medium connected to each server. Explanation will be made hereinbelow with respect to the server 50 as an example.

If the reference destination component is not loaded in the target system 1 and not stored in the secondary storing apparatus 3, the component loader 21 can requests the necessary component from the server 50 connected to the network 2. In this case, the loader 21 designates the component name and version which are requested to the server 50 through the network 2.

In response to the request from the loader 21 of the target system 1, the server 50 requests the component stored in the accumulating medium 30 to retrieve the component having the compatibility with the requested component. As a retrieving method at this time, a method similar to that at the time of retrieving the component stored in the secondary storing apparatus 3 can be used.

As a result of the retrieval of the requested component in the accumulating medium 30, if the components having the compatibility with the requested component are found, the server 50 transmits the found components to the target system 1 through the network 2. It is also possible to construct the apparatus in a manner such that the relevant components are put into a predetermined address on the network 2 and the target system 1 accesses this address and downloads the relevant components.

In the target system 1, the transmitted or downloaded components are received. The received components are transferred to the loader 21. The loader 21 reads and stores the components into the RAM 13 and loads them into the system 1 as also mentioned above. It is also possible that among the transferred components, the reference source component 4A reads and stores only the portion necessary upon execution into the RAM 13.

When the component sent from the server 50 is loaded into the system 1, a fact that the designated reference destination component has been loaded is notified from the loader 21 to the reference source component 4A. Thus, the reference source component 4A can use the reference destination component 4B.

A case where the server 50 does not have the component requested from the target system 1 is also considered. In this case, a fact that the requested component does not exist on the server 50 is notified from the server 50 to the target system 1. This notice is received by the target system 1 and transferred to the loader 21. A fact that there is no compatible component is notified from the loader 21 to the reference source component 4A which requested the component. In this case, since the reference destination component 4B cannot be used in the reference source component 4A, for example, an error process is executed.

If the server 50 does not have the component which is requested, a similar retrieval can be also performed with respect to each of the other servers 50', 50", . . . connected to the network. For example, the target system 1 has address information of the usable server and can obtain the requested component by successively accessing to the server shown by the address information. The invention is not limited to this method but the server 50 side can also designate the next server 50' and retrieve the component.

As described above, according to the invention, each component has version compatible information. Therefore, when the component is used, by designating the version of the component which is referred to from the component and discriminating whether the version of the component which is referred to has the compatibility with the designated version or not, whether the version of the component which is referred to has the backward compatibility with the version of the component designated on the reference source side or not can be discriminated. There is, consequently, an effect that the erroneous operation of the system due to the difference of the versions can be avoided.

According to the embodiments of the invention, there is an effect that whether the component having the compatibility with the component of the version designated by the reference source component has already been loaded in the system or not can be easily discriminated.

Therefore, there are effects such that a situation such that the components of many versions having the compatibility are simultaneously loaded into the system is avoided and a use fee of the memory can be suppressed.

The present invention is not limited to the foregoing embodiments but many modifications and variations are possible within the spirit and scope of the appended claims of the invention.

What is claimed is:

1. An information processing method, executed by a processor comprising:

constructing a program using a plurality of components,
wherein each component of said plurality of components includes version information showing a self version and a version compatible information table showing a self past version embedded in said each component, and
wherein the version compatible information table comprises a start version, an end version and a flag, the flag indicating a version range which designates a plurality of different versions satisfying requirements for compatibility with said component, based on the start version and the end version, each of the plurality of different versions within the version range indicating that the component is updated for different times;

updating said version information and said version compatible information table each time said each component is updated;

selecting, when another component sends a request to load said each component, a component of a latest version from a plurality components which has a same name but different version; and determining compatibility between said selected component's version and a version requested by said another component by loading and using said version information and said version compatible information table included in said selected component.

2. A method according to claim 1, further comprising:

selecting a latest version of said each component from said plurality of components having a same name but different versions on the basis of said version compatible information table.

3. A method according to claim 1, further comprising:

retrieving said each component when said determining step determines that the compatibility does not exist between the current version indicated by said version information and the version requested by said another component.

4. A method according to claim 3, further comprising:

communicating with a component through a network, and wherein in said each component is retrieved from a memory medium existing outside and connected through said network.

5. An information processing apparatus, comprising:

a computer-readable storage medium;

means for constructing a program using a plurality of components, wherein each component of said plurality of components includes version information showing a self version and a version compatible information table showing a self past version embedded in said each component, wherein the version compatible information table comprises a start version, an end version and a flag, the flag indicating a version range which designates a plurality of different versions satisfying requirements for compatibility with said component, based on the start version and the end version, each of the plurality of different versions within the version range indicating that the component is updated for different times, and wherein said version information and said version compatible information table is updated each time said each component is updated;

means for selecting, when another component sends a request to load said each component, a component of a latest version from a plurality components which has a same name but different version; and means for determining compatibility between said selected component's version and a version requested by said another component by loading and using said version information and said version compatible information table included in said selected component.

6. A computer-readable storage medium for storing a computer program, for assembling a program, the program comprising executable instruction that cause a computer to:

construct a program using a plurality of components, wherein each component of said plurality of components includes version information showing a self version and a version compatible information table showing a self past version embedded in said each component, wherein the version compatible information table comprises a start version, an end version and a flag, the flag indicating a version range which designates a plurality of different versions satisfying requirements for compatibility with said component, based on the start version and the end version, each of the plurality of different versions within the version range indicating that the component is updated for different times, and wherein said version information and said version compatible information table is updated each time said each component is updated;

select, when another component sends a request to load said each component, a component of a latest version from a plurality components which has a same name but different version; and determine compatibility between said selected component's version and a version requested by said another component by loading and using said version information and said version compatible information table included in said selected component.

* * * * *